(12) United States Patent
Jennings

(10) Patent No.: US 12,497,735 B1
(45) Date of Patent: Dec. 16, 2025

(54) PAPER PULP PRESSURE SCREEN

(71) Applicant: Jeffrey Leigh Jennings, Atlanta, GA (US)

(72) Inventor: Jeffrey Leigh Jennings, Atlanta, GA (US)

( * ) Notice: Subject to any disclaimer, the term of this patent is extended or adjusted under 35 U.S.C. 154(b) by 0 days.

(21) Appl. No.: 18/407,620

(22) Filed: Jan. 9, 2024

Related U.S. Application Data

(63) Continuation of application No. 18/166,970, filed on Feb. 9, 2023, now Pat. No. 11,905,661, which is a continuation of application No. 16/452,839, filed on Jun. 26, 2019, now abandoned.

(51) Int. Cl.
| | |
|---|---|
| *D21F 1/78* | (2006.01) |
| *B01D 29/23* | (2006.01) |
| *B01D 29/56* | (2006.01) |
| *B01D 35/157* | (2006.01) |
| *D21F 1/00* | (2006.01) |

(52) U.S. Cl.
CPC ............... *D21F 1/78* (2013.01); *B01D 29/23* (2013.01); *B01D 29/56* (2013.01); *B01D 35/1573* (2013.01); *D21F 1/0027* (2013.01)

(58) Field of Classification Search
CPC ......... D21F 1/78; D21F 1/0027; B01D 29/23; B01D 29/56; B01D 35/1573
See application file for complete search history.

(56) References Cited

U.S. PATENT DOCUMENTS 6,649,068 B2 * 11/2003 Phillips .................. B01D 37/02
162/251

FOREIGN PATENT DOCUMENTS

CN             207042042 U   *   2/2018

* cited by examiner

*Primary Examiner* — Waqaas Ali

(57) ABSTRACT

A paper pulp pressure apparatus includes a body casing having a pipe member and a leg member. The leg member extends diagonally from the pipe member. The pipe member includes an input end for receiving unfiltered fluid and an output end for outputting filtered fluid. The leg member includes a basket for receiving the unfiltered fluid from the input end. The basket includes a cavity which receives a rotor. The leg member includes a drain outlet which is in fluid communication with the cavity of the basket so as to receive contaminants from the unfiltered fluid unable to pass through a filtering media included in the basket.

6 Claims, 9 Drawing Sheets

PAPER PULP PRESSURE SCREEN

CROSS-REFERENCE TO RELATED APPLICATION(S)

This application claims priority to and benefits of U.S. patent application Ser. No. 18/166,970, filed on Feb. 9, 2023, which claims priority to and benefits of U.S. patent application Ser. No. 16/452,839, filed on Jun. 26, 2019, which claims priority to and benefits of U.S. Provisional Application No. 62/692,160, filed on Jun. 29, 2018, the entire contents of each of which are herein incorporated by reference.

FIELD OF THE INVENTION

An embodiment of the present invention relates to an improved paper pulp pressure screen.

BACKGROUND OF THE INVENTION

Paper pulp screens, including paper pulp pressure screens, are used to remove contaminants from pulp slurry. Contaminants may include, for example, wood knots, shives, nuts, bolts, wire, even safety helmets.

In a typical mill, there may be many paper pulp screens installed at various locations to filter pulp slurry. For example, 20 to 40 different paper pulp screens may be installed in a typical mill. A particular paper pulp screen may be placed at a particular location in a paper mill so as to protect specific equipment downstream from the particular paper pulp screen. Also, there may be a screen immediately before a fourdrinier, where it is desirable to provide homogeneous pulp slurry and maintain a consistent basis weight.

Conventional paper pulp screens take different forms. For example, FIG. 1 is a perspective view of a non-pressurized paper pulp screen 100 representative of 1940's screening technology. FIG. 2 is a perspective view of an open vibrating screen plate 200, also typical of mid-century screening technology. FIG. 3 is a schematic perspective of a more-recent paper pulp pressure screen 300. FIG. 4 is a schematic perspective of a current widely used paper pulp pressure screen 400.

Screening technology has plateaued in recent decades leaving a number of shortcomings in the conventional designs as described in more detail later herein.

BRIEF SUMMARY OF THE INVENTION

Exemplary embodiments disclosed herein describe an improved paper pulp pressure screen apparatus. The paper pulp pressure screen apparatus includes a body casing having a pipe member and a leg member which extends diagonally from the pipe member at an angle, the pipe member including an input end for receiving unfiltered fluid and an output end for outputting filtered fluid, the leg member including a basket for receiving the unfiltered fluid from the input end, the basket having a cavity therein which receives a rotor and the leg member having a drain outlet attached thereto and in fluid communication with the cavity of the basket so as to receive contaminants from the unfiltered fluid unable to pass through a filtering media included in the basket.

In some exemplary embodiments, the apparatus further includes a motor and gearbox assembly which turns the rotor received within the basket to keep the basket clear of contaminants and maintain a consistent flow out of filtered fluid.

In some exemplary embodiments, the angle of the leg member relative to the pipe member is determined based on desirable basket dimensions, desired flow rate and installation considerations.

In some exemplary embodiments, the drain outlet is configured for use with a continuous rejecting screen or with an intermittent rejecting screen.

In some exemplary embodiments, the drain outlet is continuously open with the continuous rejecting screen.

In some exemplary embodiments, the drain outlet includes one or more valves that may be selectively opened with the intermittent rejecting screen.

In some exemplary embodiments, a flow meter is used to maintain an appropriate flow rate of contaminants with the continuous rejecting screen.

In some exemplary embodiments, the one or more valves remain closed for a duration to maintain an appropriate flow rate of contaminants with the intermittent rejecting screen.

In some exemplary embodiments, the body casing is attached to an inline pipe which receives a flow of unfiltered fluid.

In some exemplary embodiments, the input end of the pipe member includes an input flange and the input flange is attached to a corresponding flange of the inline pipe.

In some exemplary embodiments, the output end includes an output flange and the output flange is attached to a corresponding flange of the inline pipe.

In some exemplary embodiments, the body casing is shaped to direct a flow of the unfiltered fluid directly into, and towards the bottom of, the basket.

In some exemplary embodiments, the basket includes a fluid opening into the drain outlet where the drain outlet receives contaminants too large to pass through the filtering media.

In some exemplary embodiments, the filtering media is a wire screen.

In some exemplary embodiments, the fluid is pulp slurry.

Other exemplary embodiments disclosed herein describe a multistage paper pulp pressure screen apparatus which includes a first stage paper pulp pressure screen, a second stage paper pulp pressure screen, a third stage paper pulp pressure screen and a fourth stage paper pulp pressure screen. Each paper pulp pressure screen includes a body casing having a pipe member and a leg member which extends diagonally from the pipe member at an angle, the pipe member including an input end for receiving unfiltered fluid and an output end for outputting filtered fluid, the leg member including a basket for receiving the unfiltered fluid from the input end, the basket having a cavity therein which receives a rotor and the leg member having a drain outlet attached thereto and in fluid communication with the cavity of the basket so as to receive contaminants from the unfiltered fluid unable to pass through a filtering media included in the basket.

In some exemplary embodiments, wherein each higher stage paper pulp pressure screen further filters the contaminants received from the drain outlet of a prior lower stage paper pulp pressure screen.

DESCRIPTION

Figure 1:
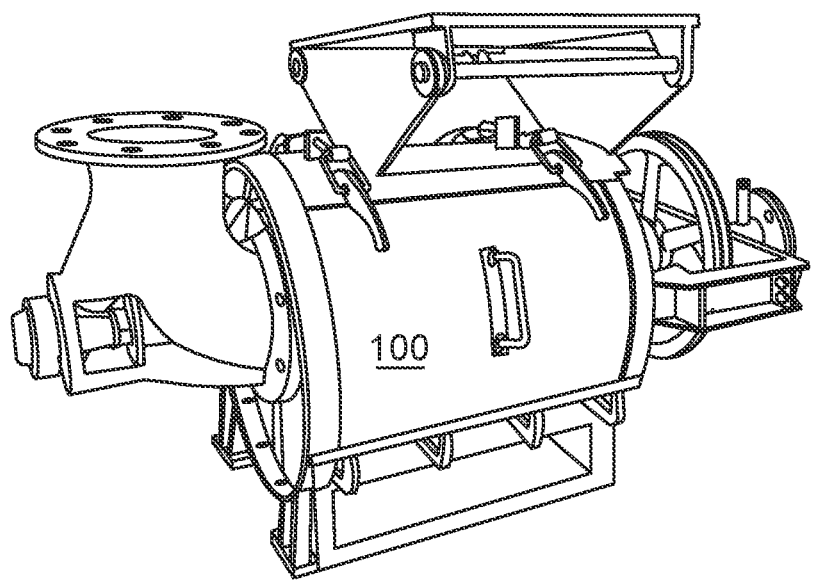
FIG. 1 is a perspective view of a conventional non-pressurized paper pulp screen.
Figure 2:
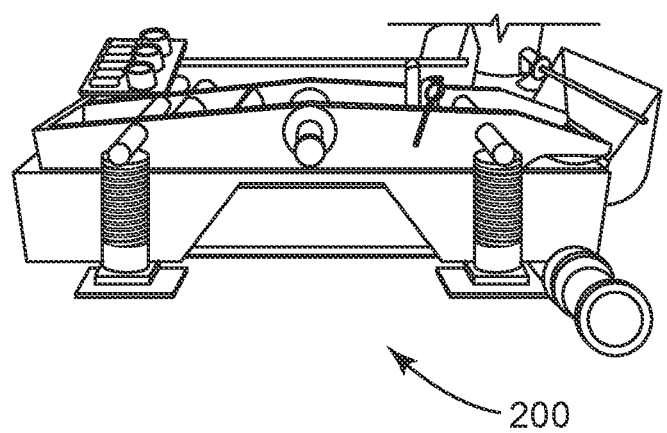
FIG. 2 is a perspective view of a conventional open vibrating screen plate.
Figure 3:
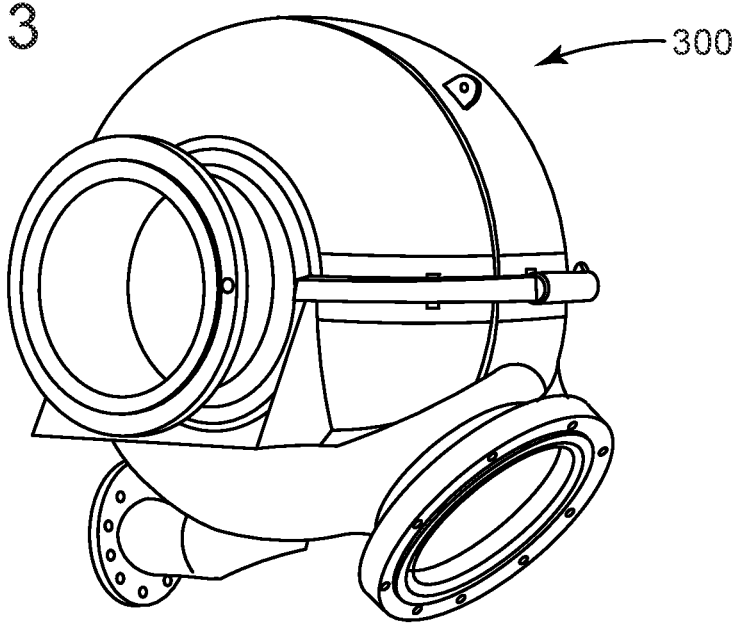
FIG. 3 is a schematic perspective of a conventional paper pulp pressure screen.
Figure 4:
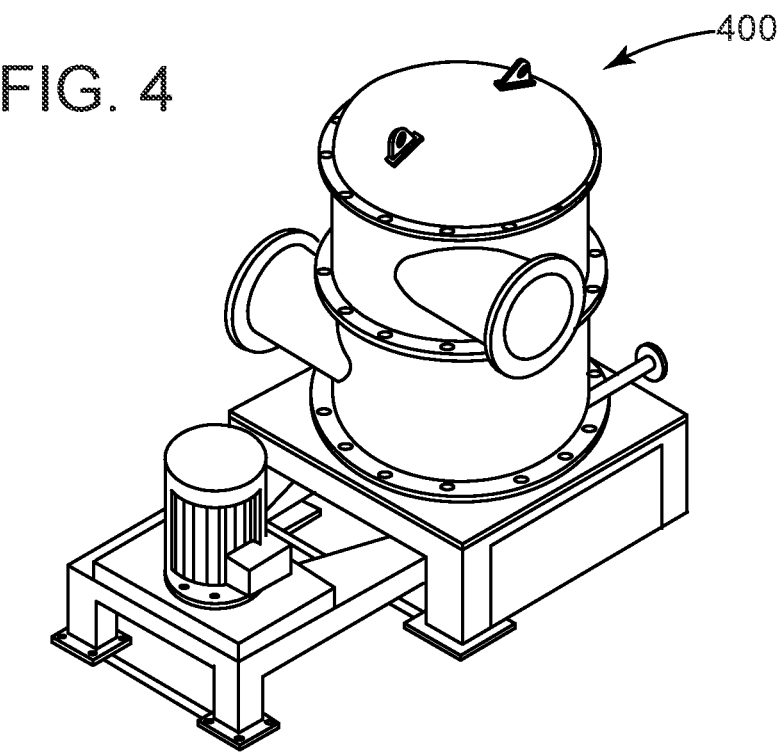
FIG. 4 is a schematic perspective of another conventional paper pulp pressure screen.

Reference will now be made in detail to embodiments of the present invention, examples of which are illustrated in the accompanying drawings, wherein like reference numerals refer to the like elements throughout. The embodiments are described below to explain the present invention by referring to the figures.

As used in the description of this application, the terms "a", "an" and "the" may refer to one or more than one of an element (e.g., item or act). For example, references to "slot" may refer to one or more than one slot. Similarly, a particular quantity of an element may be described or shown while the actual quantity of the element may differ. The terms "and" and "or" may be used in the conjunctive or disjunctive sense and will generally be understood to be equivalent to "and/or". Elements from an embodiment may be combined and substituted with elements of another. Elements described as separate elements may be combined into a single element. Similarly, an element described as a single element may be split into two or more elements.

For example, although a single casing may be described, multiple portions of a casing may be provided and combined into a single casing. No element used in the description of this application should be construed as critical or essential to the invention unless explicitly described as such. Further, when an element is described as "connected," "coupled," or otherwise linked to another element, it may be directly linked to the other element, or intervening elements may be present.

As noted above, the present inventor has recognized shortcomings with respect to conventional paper pulp screens. For example, due to the robustness and accompanying weight of conventional paper pulp screens, such screens are usually installed on purpose-built foundations and take up floor space within a mill. Typically, these foundations are designed into the overall design of the mill. Further, conventional paper pulp screens may cost up to multiple hundreds of thousands of dollars per unit, plus installation costs, which themselves may be significant. Due to the complex design of some conventional paper pulp screens, it may take a significant amount of time to maintain and repair the component parts of such conventional paper pulp screens, which may lead to increased operating costs, increased downtime, and reduced production.

The present inventor has invented an improved paper pulp pressure screen that may be lighter, can more easily be installed in a mill, more easily be retrofitted in a mill, and that may be more affordable to manufacture, maintain, and repair. The improved design may realize decreased operational and energy costs and overall installed cost. Further, the improved design may be used in applications previously prohibitive of conventional designs.

Figure 5:
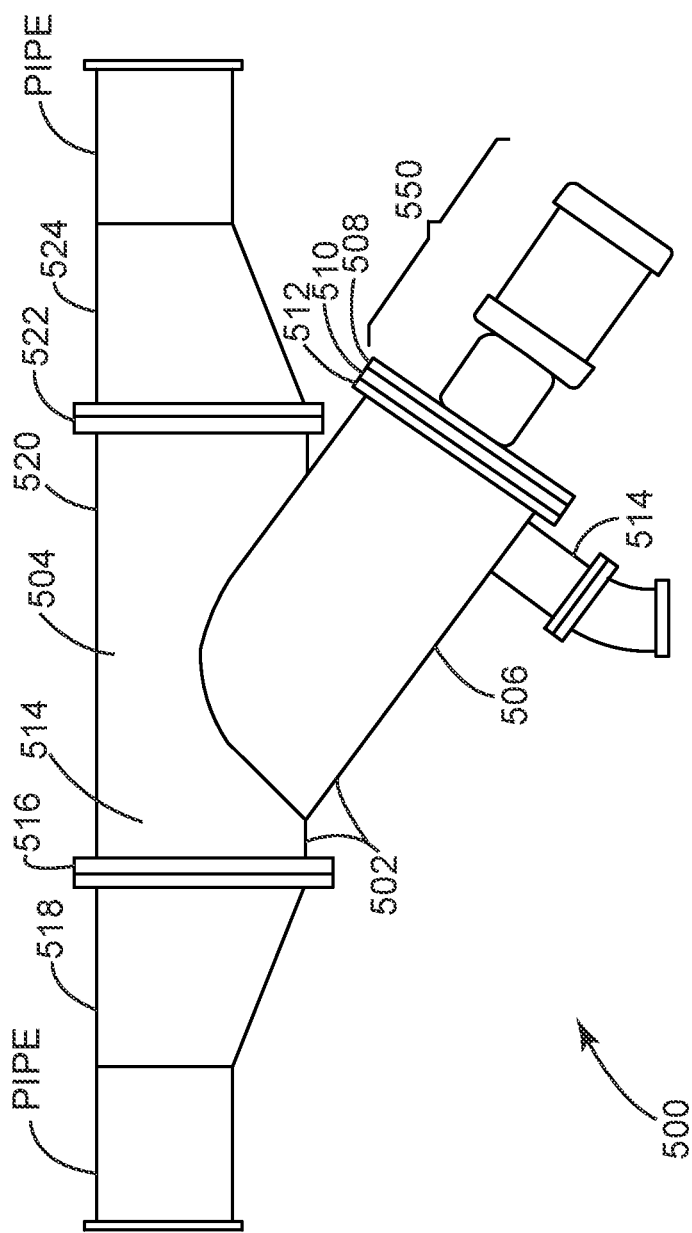
FIG. 5 is a schematic perspective of an improved paper pulp pressure screen.

Turning back to the figures, FIG. 5 is a schematic representation of an improved paper pulp pressure screen 500 according to an exemplary embodiment of the present invention. The improved paper pulp pressure screen 500 may be attached inline to a pipe ("PIPE") carrying a flow of fluid such as pulp slurry. Attaching the improved paper pulp pressure screen inline to a pipe is a significant improvement over conventional paper pulp pressure screens, particularly since doing so simplifies the installation by only having to modify the existing piping. The existing piping is modified by removing a section of the pipe and welding on two matching flanges and inserting the paper pulp pressure screen into the void between the removed section of pipe with no further support or foundation being required. As noted previously, conventional paper pulp pressure screens require a foundation for installation.

The improved paper pulp pressure screen 500 may include a casing 502 that may house components of the improved paper pulp pressure screen 500. The casing 502 may be formed from a durable material such as a metal. In an embodiment, the casing 502 may be formed from stainless steel, such as type 317L or 316L stainless steel. The casing may include a pipe portion 504 and leg portion 506. The pipe portion 504 and the leg portion 506 may be in a "y" configuration where the leg portion 506 connects to the pipe portion 504 at a diagonal angle. An exemplary range of the diagonal angle may be from 20 to 70 degrees. A further exemplary range may be from 25 to 60 degrees. A further exemplary range may be from 30 to 50 degrees.

Considerations in setting the angle of the leg portion 506 relative to the pipe portion 504 may include desirable basket (530 in FIG. 6) dimensions (such as depth), desired flow rate, and installation considerations.

The fluid such as pulp slurry carried by the pipe may flow into the improved paper pulp pressure screen 500 through a first end (or input) 514 of the pipe portion 504. The fluid is unscreened (relative to this screen 500) upon passing through the first end 514. The first end 514 may include an input flange 516. The first end 514 may be connected to the pipe carrying the pulp slurry, such as by attaching the input flange 516 to a corresponding flange of the pipe. Optionally, the first end 514 (such as the input flange 516) may be connected to an input transition fitting 518, such as by attaching the input flange 516 to a flange of the input transition fitting 518. Such an input transition fitting may be used in the event the pipe portion 504 is greater in diameter than the pipe to which the improved paper pulp pressure screen 500 is attached (as shown in the figures).

The fluid such as the pulp slurry may flow out of the improved paper pressure screen 500 through a second end (or output) 520 of the pipe portion 504. The fluid is filtered (relative to this screen 500) upon passing through the second end 520. The second end 520 may include an output flange 522. The second end 520 may be connected to the pipe carrying the pulp slurry, such as by attaching the output flange 522 to a corresponding flange of the pipe. Optionally, the second end 520 (such as the output flange 522) may be connected to an output transition fitting 524, such as by attaching the output flange 522 to a flange of the output transition fitting 524. Such an output transition fitting may be used in the event the pipe portion 504 is greater in diameter than the pipe to which the improved paper pulp pressure screen 500 is attached.

The improved pulp paper pressure screen 500 may include a motor and gearbox (e.g., reducer) assembly 550. The motor and gearbox assembly 550 may be connected to a rotor (540 in FIG. 9) and include a first flange 508 therebetween. Basket 530 may be connected to a second flange 510. A third flange 512 may be connected to an end of the leg portion 506 of the casing 502. In an embodiment, the third flange 512 may be formed with and a part of the leg portion 506. The insertion of the basket 530 and the rotor 540 for operation is discussed in more detail later herein.

Upon full insertion of the basket 530 and the rotor 540, the second flange 510 (connected to the basket 530) may abut the third flange 512. The first flange 508 (connected to the motor and gearbox assembly 550) may abut the second flange 510. The first flange 508 and the second flange 510 may be secured together and against the third flange 512 by appropriate fasteners, such as bolts (whether a part of one or more of the flanges or inserted therethrough) and nuts. The securing of the first and second flanges 508, 510 to the third flange 512 is described in more detail later herein.

The casing 502 of the improved paper pulp pressure screen 500 may further include a drain outlet 514. The drain outlet 514 may be connected to the leg portion 506. The drain outlet 514 may extend outwardly from the leg portion 506 and be in fluid communication with a cavity of the basket 530 so as to receive contaminants too large to pass through the filtering media (discussed in more detail later herein) of the basket 530. Stated differently, an opening in the basket 530 allows contaminants to pass into the drain outlet 514.

Figure 6:
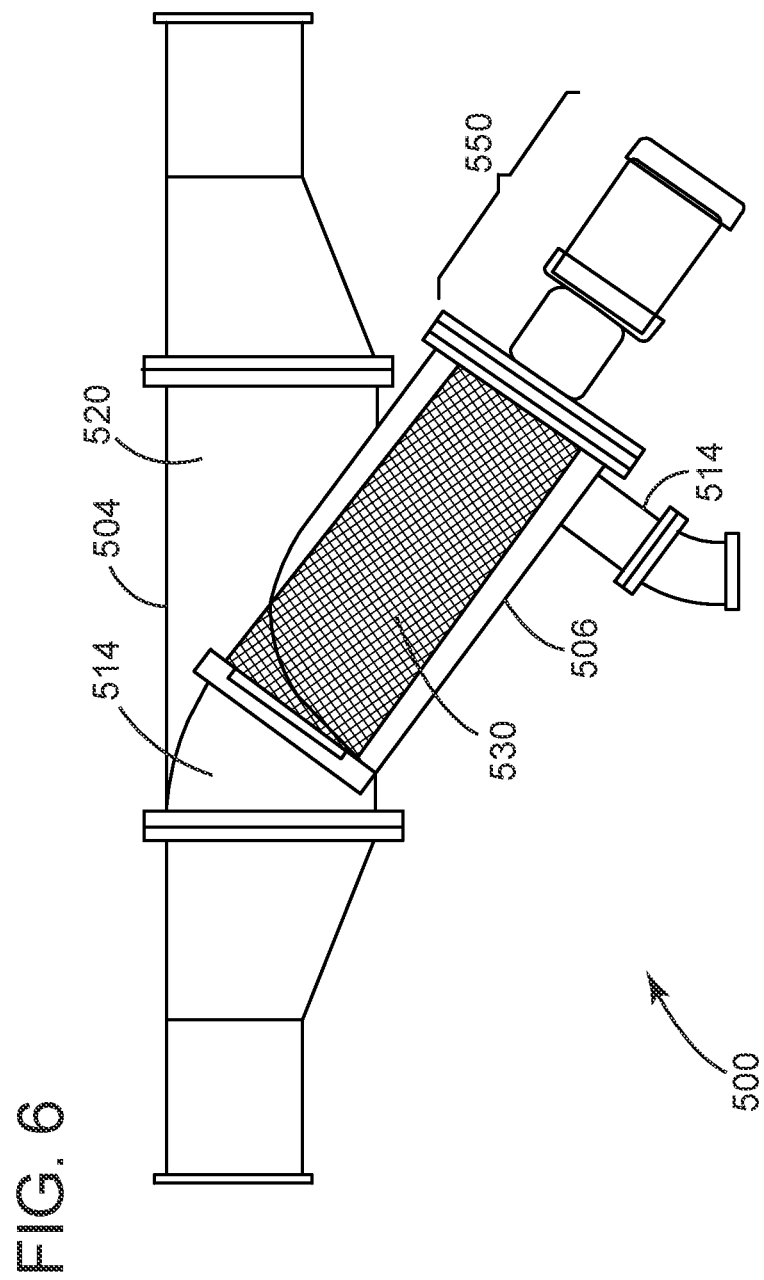
FIG. 6 is a schematic cutaway of the improved paper pulp pressure screen of FIG. 5.
Figure 7:
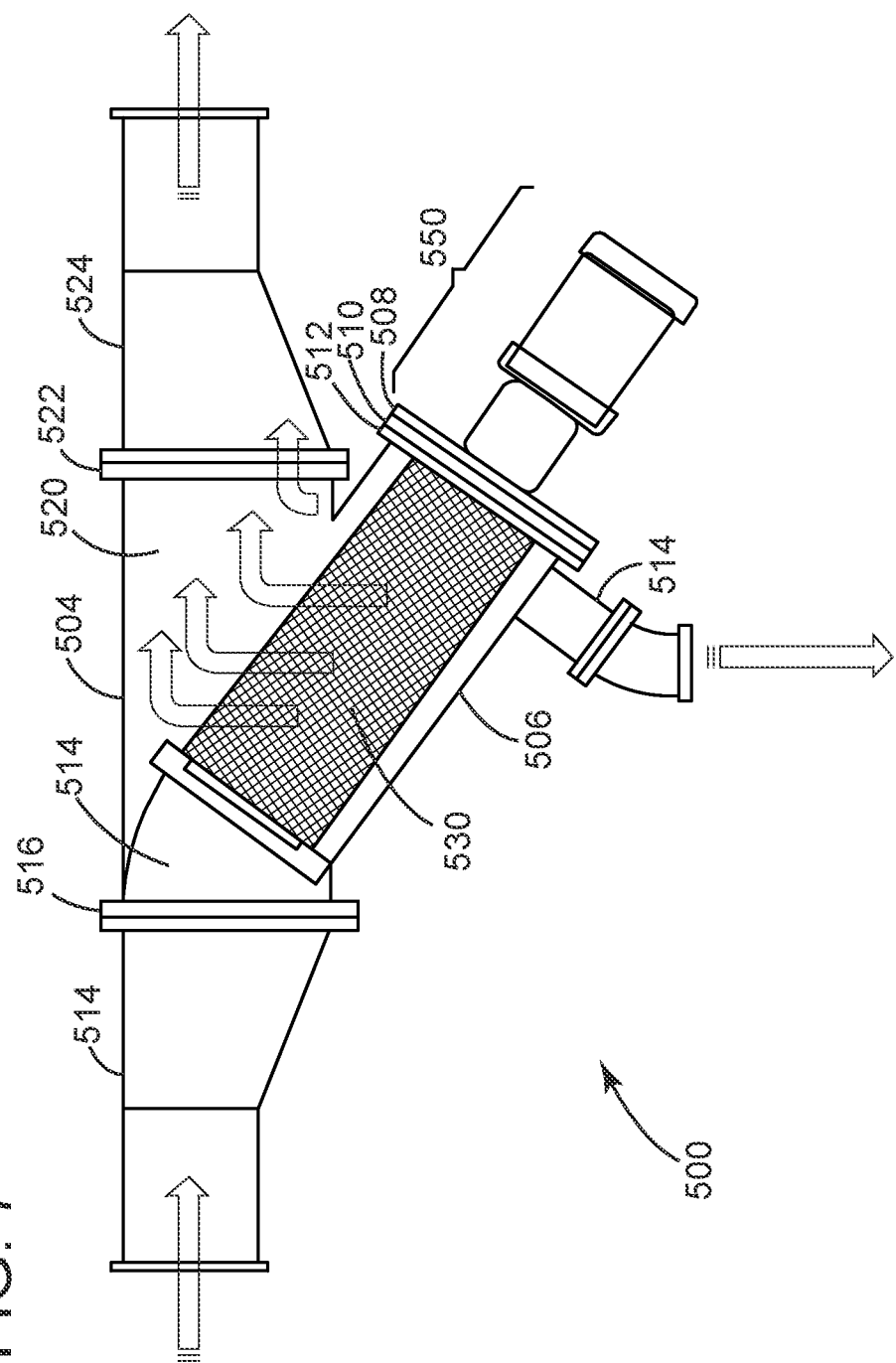
FIG. 7 is a schematic cutaway of the improved paper pulp pressure screen of FIG. 5 depicting fluid flows.

FIG. 6 is a schematic cutaway of the improved paper pulp pressure screen 500 of FIG. 5. FIG. 7 is a schematic cutaway of the improved paper pulp pressure screen 500, depicting fluid flows. As shown, the basket 530 is in its operational position within the leg portion 506 of the casing 502. It should be appreciated that, in an embodiment, the basket 530 does not rotate when it is within the leg portion 506. Fluid such as pulp slurry carried by the pipe may flow into the improved paper pulp pressure screen 500 through the first end 514 of the pipe portion 504, and then be directed directly into the cavity of the basket 530. In an embodiment, the casing 502 may be formed to direct the flow from the first end 514 directly into, and towards the bottom of, the basket 530. That is, the casing 502 may be shaped to direct a flow of the pulp slurry directly into, and towards the bottom of, the basket 530. The basket 530 may include a fluid opening into the drain outlet 514 on the side of the basket 530, near the bottom of the side. The drain outlet 514 may not contain filtering media, but rather be an opening so as to receive contaminants too large to pass through the filtering media. Contaminants may be pushed by flow towards the drain outlet 514. Contaminants may be pulled by gravity towards the drain outlet 514. It is conceivable that a design of the rotor 540 may also affect the flow of contaminants towards or relative to the drain outlet 514. The drain outlet 514 may be of different designs. For example, the drain outlet 514 may be configured for use with a continuous rejecting screen embodiment or may be configured for use with an intermittent rejecting screen embodiment.

In a continuous rejecting screen embodiment, the drain outlet may be continuously open thereby allowing contaminants to flow out through the drain outlet continuously. Such a design may be desirable for, but not limited to, use with pulp slurry that has contaminants that tend to be more difficult to screen (e.g., shives) and also where pulp slurry has a higher level (i.e., amount) of contaminants. In a continuous rejecting screen embodiment, a flow meter may be provided to maintain an appropriate flow rate considering the effect the continuously open drain outlet may have on flow rate.

In an intermittent rejecting screen embodiment, the drain outlet may include one or more valves that may be selectively opened so as to allow the contaminants to flow out through the drain outlet when the one or more valves of the drain outlet are opened. For example, two valves may be provided and, as part of a cycle, a top valve may be opened and then a bottom valve may be opened. Such a design may be desirable for, but not limited to, use with pulp slurry having contaminants that tend to be easier to filter (e.g., bolts and knots) and also where pulp slurry has a lower level of contaminants. In an intermittent rejecting screen embodiment, the one or more valves may remain closed for a duration so as to maintain an appropriate flow rate. Even during a drain cycle, one valve may be opened while another is closed so as to maintain an appropriate flow rate.

With respect to the basket 530, it is to be appreciated by those skilled in the art that the filtering media is shown schematically in FIG. 6 as a square wire screen. However, any number of different filtering media may be utilized. For example, slots may be provided around the circumference of the basket 530. In an embodiment, the slots may be so narrow as to be measured in microns. In another embodiment, circular holes may be provided around the circumference of the basket 530. In yet another embodiment, conical holes may be provided around the circumference of the basket 530. Considerations in designing the basket (e.g., basket dimensions, how many slots or holes, the size and shape thereof) may include, e.g., a desired flow rate, size and amount of contaminants to be filtered, whether the improved paper pulp pressure screen 500 is a continuous rejecting screen or an intermittent screen, and velocities of flows within the casing and within the basket.

Prior to operation, the basket 530 may be inserted into the leg portion 506 such that the second flange 510 abuts the third flange 512. The second flange 510 may be secured to the third flange 512 by appropriate fasteners. For example, the second flange 510 may be secured to the third flange 512 by bolts (built in, e.g., to the third flange, or non-built in) and nuts, clips, or other fasteners.

Turning again to FIG. 7, when the basket 530 is in its operational position within the leg portion 506 of the casing 502, the entire circumference of the basket 530 (except the drain outlet 514) is open to space within the casing 502 so as to allow fluid such as pulp slurry to pass therethrough. For example, the top approximately 180 degrees of the basket 530 may be open to a large space leading directly to the output 520 of the casing 502, while the bottom approximately 180 degrees may be open to a space that is open to the space leading directly to the output 520. According to such an embodiment, a maximum amount of the filtering media may be applied to the fluid such as the pulp slurry. In such an embodiment, where the entire flow of slurry is directed into the cavity of the basket towards the bottom of the basket 530, all 360 degrees of filtering media may be utilized in filtering contaminants.

Figure 8:
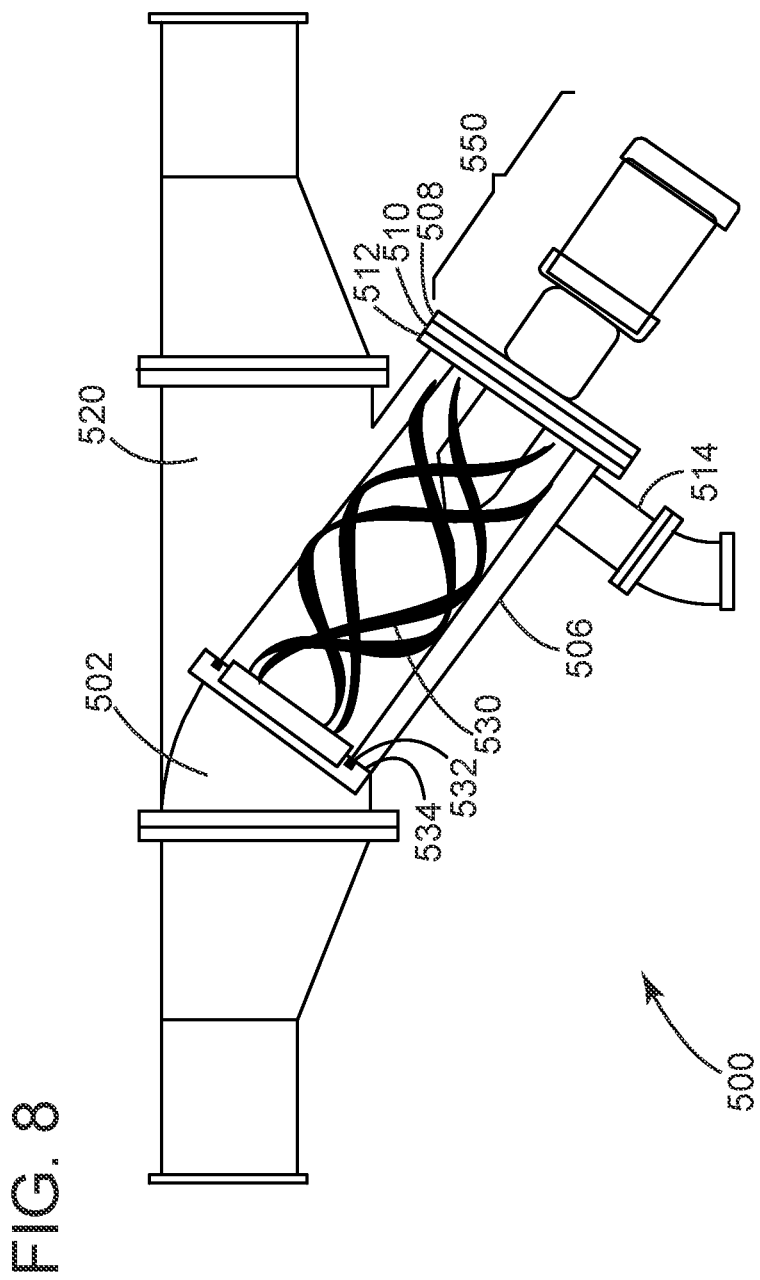
FIG. 8 is a schematic cutaway of the improved paper pulp pressure screen of FIG. 5 showing the rotor in an operational position.

As with the basket 530, the rotor 540 may, prior to operation, be inserted into the basket 530 which is within the leg portion 506 of the casing 502. FIG. 8 is a schematic cutaway of the improved paper pulp pressure screen 500 of FIG. 5 showing the rotor 540 in an operational position. The rotor 540 may be connected to the motor and gearbox assembly 550. The rotor 540 (and motor and gearbox assembly) may be inserted into the basket 530 such that the first flange 508 abuts the second flange 510. The first flange 508 may be secured to the second flange 510 and/or the third flange 512 by appropriate fasteners. For example, the first flange 508 may be secured to the second flange 510 and/or the third flange 512 (with the second flange 510 between) by bolts (built in or otherwise) and nuts, clips, or other fasteners.

Bearings 532, such as polyethylene, polyurethane, polyamide bearings, may be provided within a collar 534 of the basket 530. Alternative designs where bearings are placed at top and/or at bottom of the rotor 540 are contemplated. When the rotor 540 is installed within the basket 530, rotor may freely rotate within the collar 534 due to the bearings 532. Alternate designs and bearings are contemplated and are within the scope of the present invention. Rotor 540 may be driven by motor or motor and gearbox assembly 550 (or impeller as described more below) to rotate within the basket 530 to keep filtering media of the basket clean of contaminants so that there is consistent flow out of filtered fluid.

Figure 9:
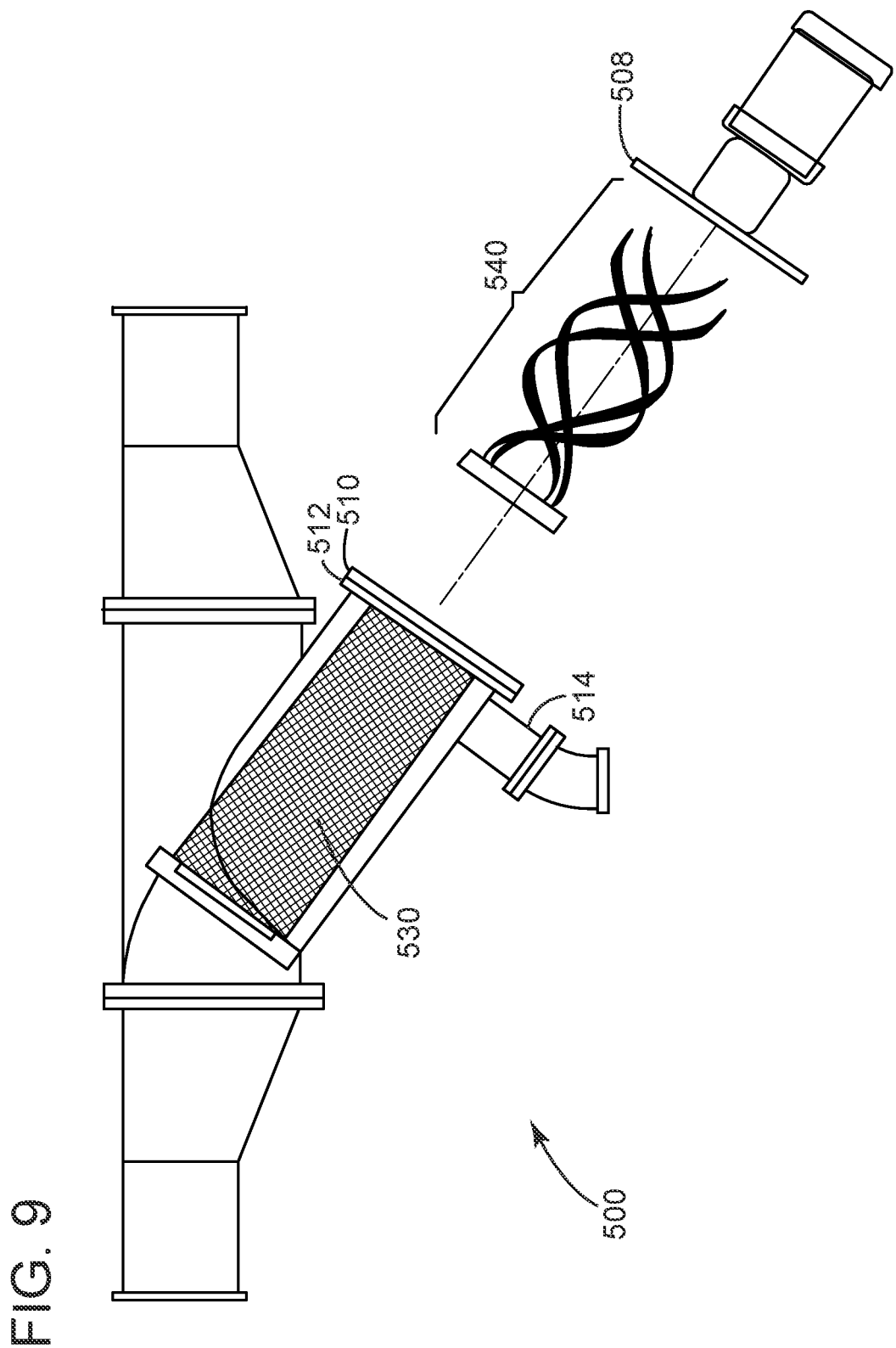
FIG. 9 is a schematic cutaway of the improved paper pulp pressure screen of FIG. 5 where the rotor has been removed from the leg portion.

FIG. 9 is a schematic cutaway of the improved paper pulp pressure screen 530 of FIG. 5 where the rotor 540 has been removed from the leg portion 506. The basket 530 and the rotor 540 may be removed from the leg portion 506 for maintenance and replacement. It is to be appreciated by those skilled in the art that rotor 540 shown in FIG. 9 is a schematic representation. However, any number of different rotor 540 designs may be utilized. For example, a number of blades may be arranged so as to pass closely to the filtering media of the basket 530 during rotation. For example, 8 blades may be provided. In another embodiment 12 blades may be provided. Considerations in designing the rotor may include, e.g., those listed above with respect to the basket.

Figure 10:
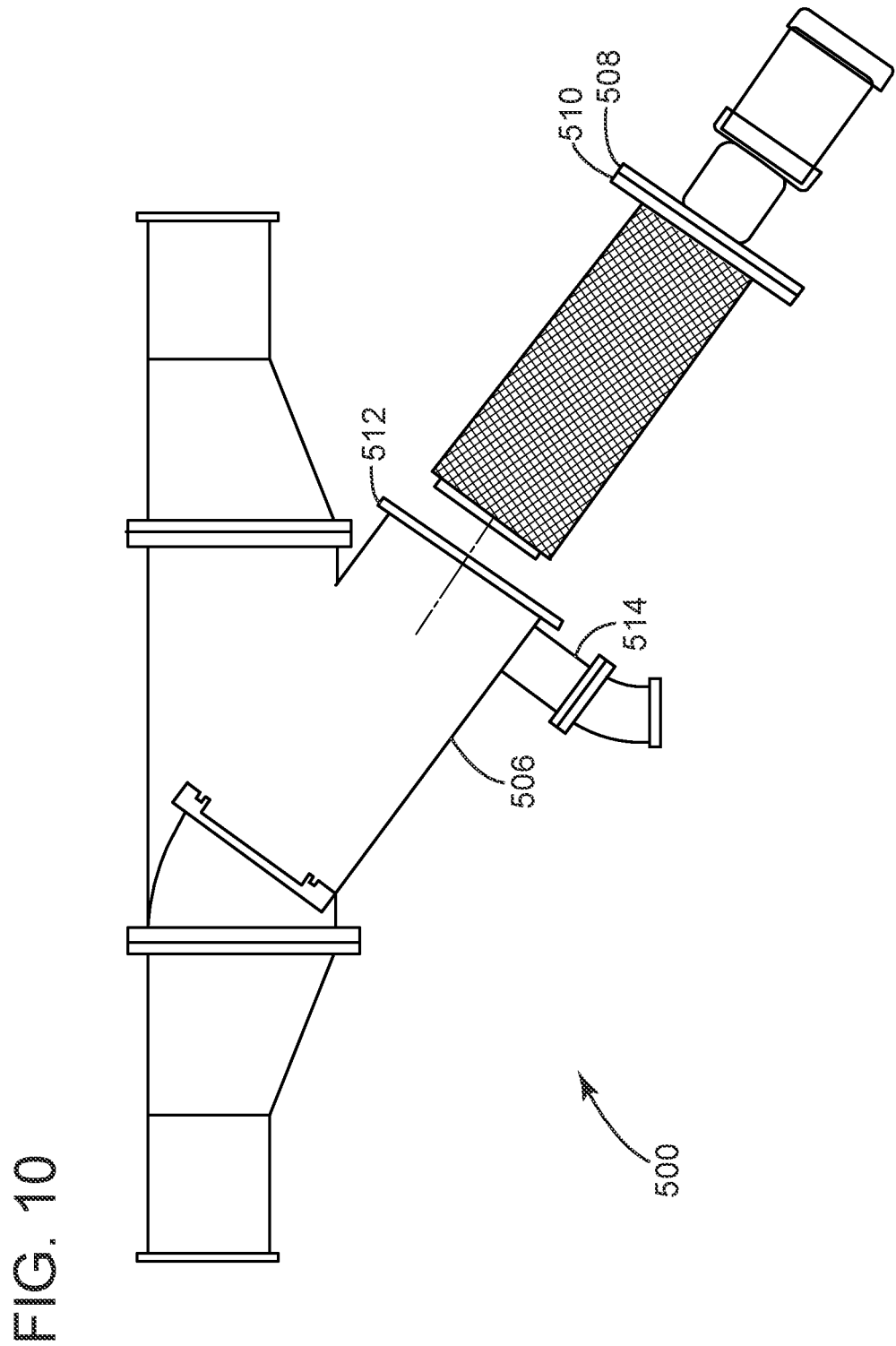
FIG. 10 is a schematic cutaway of the improved paper pulp pressure screen of FIG. 5 where the basket and rotor have been removed.

Those skilled in the art will appreciate that the fasteners of the first flange 508 and second flange 510 may be secured to the third flange 512 such that removal of a first set of fasteners (such as nuts) may allow removal of the rotor 540 while removal of a second set of fasteners (such as nuts) may allow removal of the basket (or the rotor 540 and the basket 530). FIG. 10 is a schematic cutaway of the improved paper pulp pressure screen 500 of FIG. 5 where the basket 530 and the rotor 540 have been removed from the leg portion 502. Removal of the rotor 540 may be desirable when replacing or maintaining the rotor, or when cleaning out the basket 530 or in other situations where the basket can remain within the leg portion 506. Removal of the rotor with and within the basket 530 may be desirable, for example, when the basket and rotor need replacement, and when access to the inside of the casing 502 is desirable. For example, if a large object causes harm to the basket and the rotor, it may be desirable to replace both.

Figure 11:
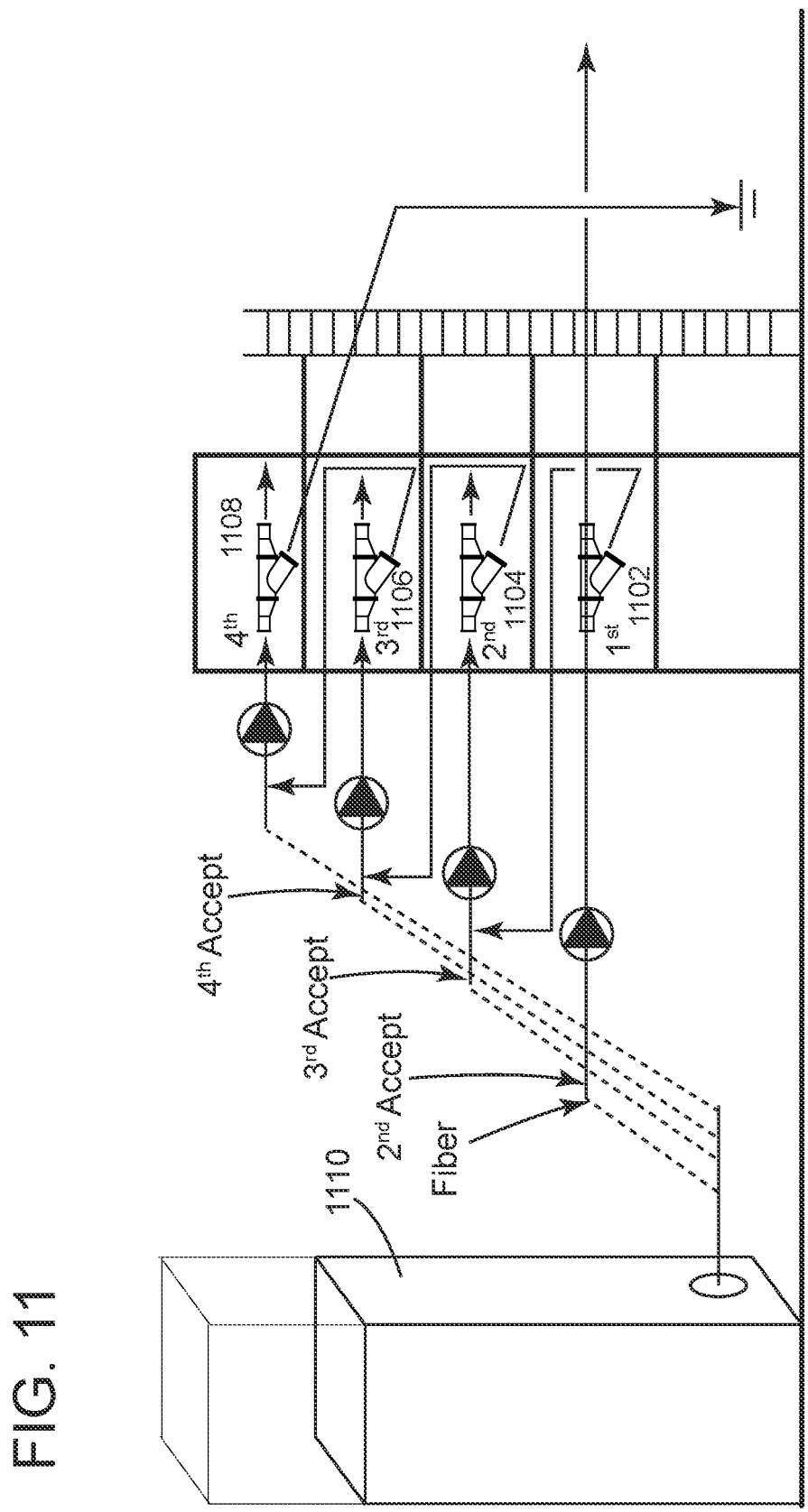
FIG. 11 is a schematic representation of a plurality of improved paper pulp pressure screens, according to an exemplary multiple-stage embodiment of the present invention.

FIG. 11 is a schematic representation of a plurality of improved paper pulp pressure screens 1102, 1104, 1106, 1108 according to an exemplary multiple-stage embodiment 1100 of the present invention. Although four screens are depicted, this is purely for example. Any number of improved paper pulp pressure screens may be provided, depending on installation considerations.

The first screen 1102 receives as input, paper pulp (fiber) and also dilution from storage 1110. The first screen outputs through its second end (or output) filtered slurry. The first screen outputs through its drain output (or rejects) to a flow going to the second screen 1104.

The second screen 1104 receives as input, dilution from storage 1110 and the output of the drain outlet (or rejects) from the first screen 1102. The second screen outputs through its second end (or output) filtered slurry. The second screen outputs through its output (or rejects) to a flow going to the third screen 1106.

The third screen 1106 receives as input, dilution from storage 1110 and the output of the drain outlet (or rejects) from the second screen 1104. The third screen outputs through its second end (or output) filtered slurry. The third screen outputs through its output (or rejects) to a flow going to the fourth screen 1108.

The fourth screen 1104 receives as input, dilution from storage 1110 and the output of the drain outlet (or rejects) from the third screen 1106. The fourth screen outputs through its second end (or output) filtered slurry. The fourth screen outputs through its output (or rejects) to, e.g., a mechanism for disposal (e.g., a screw press for drying and burning), or for further processing.

It will be apparent to those skilled in the art that the first through fourth screens (1102-1108) may be the same or distinct types of screens and may include different baskets or rotors so as to filter different contaminants. Further, some of the screens may be continuous rejecting screens while others may be intermittent rejecting screens.

The foregoing description discloses only exemplary embodiments of the invention Modifications of the above-disclosed embodiments of the present invention (beyond those modifications already mentioned) of which fall within the scope of this disclosure will be readily apparent to those skilled in the art. For example, although first 508, second 510, and third 512 flanges are described, alternative embodiments using fewer or more flanges are contemplated and should be considered to be within the scope of this disclosure. As another example, an impeller may be provided at the input of the casing 502. The impeller may be powered by the flow of liquid coming into the casing 502. The impeller may be connected to and drive the rotor 540 thereby augmenting or replacing the motor and/or gearbox 550. Such alternatives are contemplated and are considered to be within the scope of this disclosure.

Accordingly, although embodiments of the present invention have been shown and described, it would be appreciated by those skilled in the art that changes may be made in these embodiments without departing from the principles and spirit of the invention.

What is claimed is:

1. A method of manufacturing a two-outflow paper pulp pressure screen, the method comprising:
providing an input end of a casing of the two-outflow paper pulp pressure screen that continuously receives pulp slurry;
providing a basket in the casing of the two-outflow paper pulp pressure screen that receives the continuously received pulp slurry from the input end, the basket including filtering media defining a cavity and drain opening in a side of the basket, said drain opening not including the filtering media;
providing a filtered pulp slurry output end of the casing of the two-outflow paper pulp pressure screen that continuously outputs filtered pulp slurry that has passed through the filtering media;

providing a leg member of the casing, said leg member including a contaminant drain outlet of the casing of the two-outflow paper pulp pressure screen that is in fluid communication with the drain opening of the basket and continuously outputs contaminant outflow that has passed through the drain opening in the side of the basket; and providing a flow meter that maintains a selected flow rate of the two-outflow paper pulp pressure screen, wherein the casing of the two-outflow paper pulp pressure screen is configured in a Y-shape, the input end of the casing and the filtered pulp slurry output end of the casing form a pipe member of the Y-shape, the leg member of the casing forms a leg of the Y-shape extending diagonally from the pipe member at an angle, and the angle is within a range of 20 degrees to 70 degrees.

2. The method of manufacturing the two-outflow paper pulp pressure screen of claim 1, wherein the flow meter maintains the selected flow rate considering an effect of the continuously output contaminant outflow.

3. The method of manufacturing the two-outflow paper pulp pressure screen of claim 1, wherein the flow meter maintains the selected flow rate of the contaminant drain outlet of the casing of the two-outflow paper pulp pressure screen continuously outputting contaminant outflow.

4. The method of manufacturing the two-outflow paper pulp pressure screen of claim 1, further comprising:

providing a rotor or an impeller, housed within the cavity of the basket and continuously rotating to prevent the contaminant outflow from clogging the filtering media of the basket.

5. The method of manufacturing the two-outflow paper pulp pressure screen of claim 4, further comprising:

providing a motor, wherein the rotor or the impeller is continuously driven by the motor.

6. The method of manufacturing the two-outflow paper pulp pressure screen of claim 1, wherein the angle is configured considering basket dimensions and the selected flow rate.

\* \* \* \* \*